United States Patent [19]

Tognotti

[11] Patent Number: 5,076,709
[45] Date of Patent: Dec. 31, 1991

[54] SHOWER FLANGE THERMOMETER

[76] Inventor: William M. Tognotti, 1030 Hyde St., Burlingame, Calif. 94109

[21] Appl. No.: 620,725

[22] Filed: Dec. 3, 1990

[51] Int. Cl.[5] .................. G01K 1/14; G01K 13/02
[52] U.S. Cl. .................... 374/147; 374/141; 4/605; D23/228
[58] Field of Search ............... 374/147, 148, 206, 208, 374/141; D23/228, 229, 223, 224, 225, 226, 227; 4/559, 605; 285/46, 93; D10/57; D8/350, 352, 353, 354

[56] References Cited

U.S. PATENT DOCUMENTS

| Des. 146,308 | 2/1947 | Harman | 374/147 |
|---|---|---|---|
| Des. 241,510 | 9/1976 | Fisher | D8/353 |
| 899,201 | 9/1908 | Braybrook | 374/147 |
| 2,534,378 | 12/1950 | Schlaich | 374/147 |
| 2,626,524 | 1/1953 | Harman | 374/148 |
| 2,645,116 | 7/1953 | Baxter | 374/148 |
| 2,737,050 | 3/1956 | Moninger | 374/147 |
| 3,059,474 | 10/1962 | Keller et al. | D10/57 |
| 3,924,468 | 12/1975 | Persson | 374/147 |
| 3,952,594 | 4/1976 | McMahan | 374/147 |
| 3,960,016 | 6/1976 | Symmons | 374/141 |
| 3,981,266 | 9/1976 | Persson | 374/147 |
| 4,659,236 | 4/1987 | Hobbs | 374/208 |
| 4,735,511 | 4/1988 | Gauer et al. | 374/141 |
| 4,994,792 | 2/1991 | Ziegeler, Jr. | 374/147 |

FOREIGN PATENT DOCUMENTS

| 2423918 | 11/1975 | Fed. Rep. of Germany | 374/147 |
|---|---|---|---|
| 2638522 | 5/1990 | France | 374/147 |
| 0188918 | 7/1937 | Switzerland | 374/147 |
| 1342725 | 1/1974 | United Kingdom | 374/206 |

Primary Examiner—William A. Cuchlinski, Jr.
Assistant Examiner—Diego F. F. Gutierrez
Attorney, Agent, or Firm—Douglas E. White

[57] ABSTRACT

A shower flange thermometer includes a circular casing having a planar front face, the center of the front face forming a circular pipe-receiving aperture. Inside the casing is a thermometer having a temperature-sensitive foot adjacent to the aperture for transferring heat from and to the shower pipe. A transparent window in the face displays temperatures of the shower water as indirectly indicated by the temperature of the pipe.

15 Claims, 1 Drawing Sheet

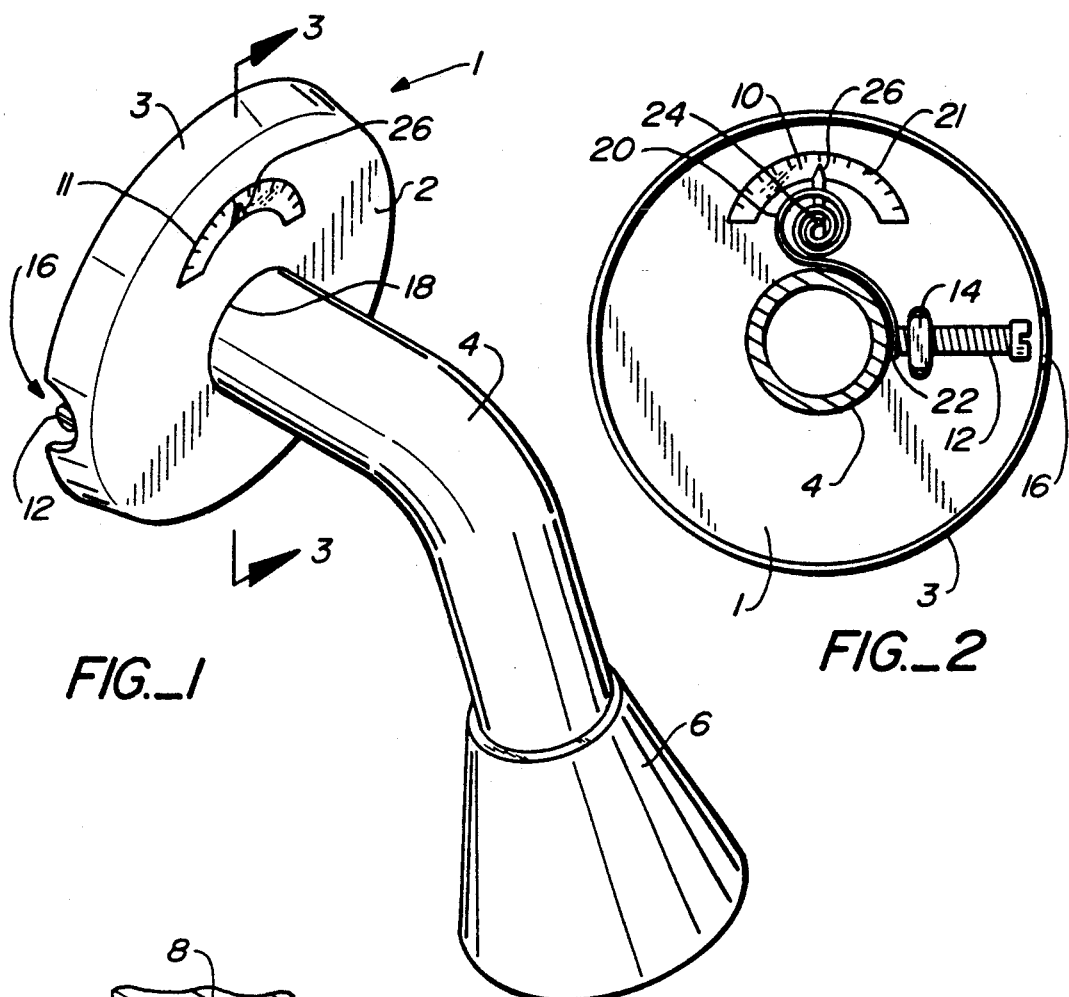
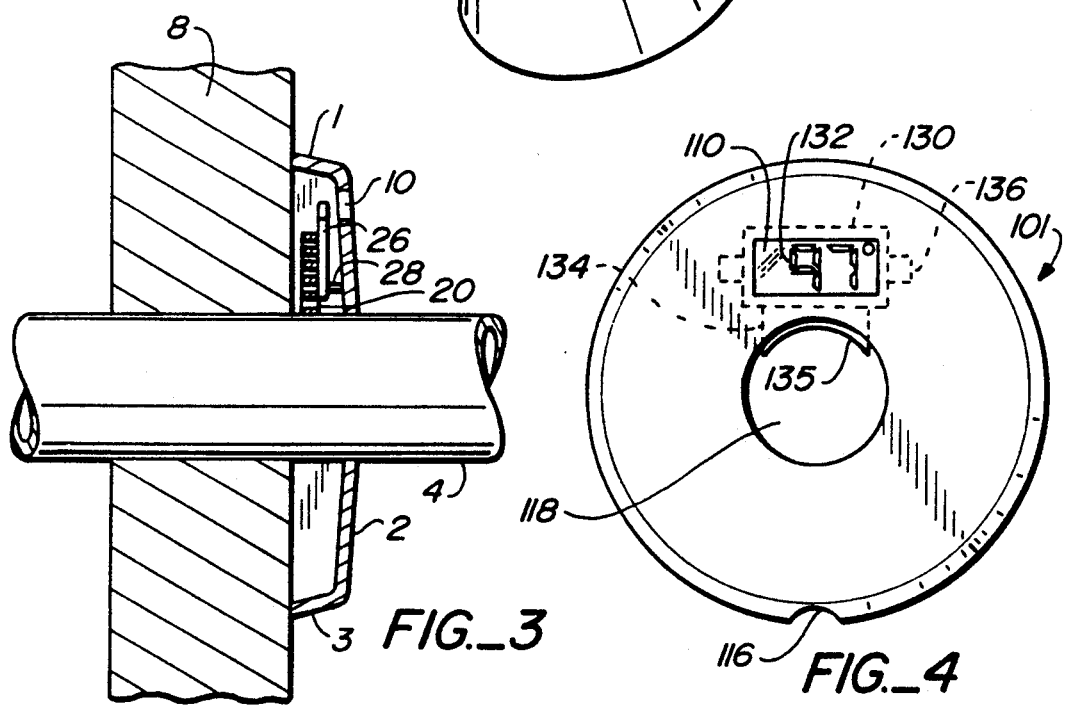

SHOWER FLANGE THERMOMETER

FIELD OF THE INVENTION

This invention relates to temperature indicating devices, more particularly to a shower pipe flange having means for indicating the temperature of water flowing through the shower pipe.

BACKGROUND OF THE INVENTION

Entering a shower without first checking the water temperature can be uncomfortable, even dangerous. Checking first with one's hand may not indicate the reaction one will have when the whole body becomes immersed in the stream. Therefore, there is a need for a device which will give a visual indication of the shower water temperature, to enable it to be pre-judged for comfort and safety and adjusted prior to any bodily contact with the stream.

Prior developments in this field may be generally illustrated by reference to the following patents:

| Patent No. | Patentee | Issue Date |
| --- | --- | --- |
| 3,952,594 | W. McMahan | Apr. 27, 1976 |
| 3,924,468 | R. Persson | Dec. 09, 1975 |
| 4,773,767 | A. Coll | Sep. 27, 1988 |
| 2,626,524 | S. Harman | Jan. 27, 1953 |
| 4,281,543 | Z. Raz | Aug. 04, 1981 |
| 4,030,360 | J. Fortune | Jun. 21, 1977 |
| D 146,308 | S. Harman | Feb. 04, 1947 |
| 4,509,550 | K. Monk | Apr. 09, 1985 |
| 4,458,839 | R. MacDonald | Jul. 10, 1984 |
| 3,960,016 | P. Symmons | Jun. 01, 1976 |
| 4,630,940 | U. Ostertag et al. | Dec. 23, 1986 |
| 4,682,626 | K. Bergmann | Jul. 28, 1987 |
| 4,575,262 | M. Andersen | Mar. 11, 1986 |

Many of these patents are directed to water flow temperature gauges for applications other than showers, such as sink faucets and the like. Of those directed toward shower applications, most require modifications to the shower head or shower pipe and, therefore, are difficult and/or expensive to install.

U.S. Pat. No. 3,924,468 shows a temperature gauge which clamps on the pipe. While not difficult to install, it is relatively complex. Furthermore, being a relatively large device which is an addition to the normal components of a shower, some users may consider that it detracts from the appearance of the shower. Furthermore, it cannot be used for flexible pipe showers.

SUMMARY OF THE INVENTION

The present invention is a shower flange which has temperature sensing means and temperature indicating means incorporated within its casing. In general, shower flanges are normal components of most showers. They are installed at the junction of the pipe and the wall. They function to cover up this unsightly junction in a decorative manner. The present invention incorporates its working components within a presently unused cavity of existing shower flanges. It does not significantly affect the size or shape of the shower flange. It is installed simply and quickly in the manner of normal shower flanges. Use of the present device, therefore, will not change or detract from the normal appearance of a shower set-up.

FEATURES AND ADVANTAGES

An object of this invention is to provide a device for measuring shower water temperature, before or during bathing, which does not add a new component to the normal shower set-up (i.e. the shower pipe, the shower head, and the shower flange.) Accordingly, the present invention adds temperature sensing and indicating means to an existing style of shower flange.

Another object of this invention is to provide a device which is easy to install. Accordingly, the present shower flange fits over the shower pipe in the normal manner. It incorporates a set-screw tightener which is easy to reach.

A further object is to provide a temperature sensing mechanism which is compact, reliable and inexpensive to produce. Accordingly, two types of thermometer assemblies are disclosed: one bi-metallic and one electronic.

Yet another object is to incorporate means for engaging (or "biasing") the temperature sensor into tight contact with the shower pipe. The set-screw means also performs this function.

A further object is to enable the internal thermometer to be read externally. A transparent window is provided, which window may have a temperature gauge printed on it.

Another object is to provide an apparatus which is easy to use and attractive in appearance. Furthermore, insofar as it allows rapid and reliable adjustment of water temperature, it can be expected to result in significant energy and water savings, at a time when the conservation of both is widely urged.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, the words "upwardly," "downwardly," "leftwardly," and "rightwardly" will refer to directions in the drawings to which reference is made. The words "inwardly" and "outwardly" will refer to directions toward and away from, respectively, the geometric center of a device and designated parts thereof.

BRIEF DESCRIPTION OF THE DRAWING

FIG. 1 is a perspective view of a shower flange thermometer of this invention;

FIG. 2 is a rear elevation of the shower flange of FIG. 1;

FIG. 3 is a frontal sectional elevation of the shower flange, taken along line 3—3 of FIG. 1; and FIG. 4 is a frontal elevation of an alternate embodiment of the invention.

DRAWING REFERENCE NUMERALS 1 shower flange
2 face of 1, front
3 side wall of 1
4 pipe 6 shower head
8 wall
10 transparent section of 1
11 temperature gauge indicia on 10
12 set screw
14 bracket for 12
16 screw notch in 1
18 pipe aperture in 1
20 bi-metallic coil
22 outer end of 20
24 inner end of 20
26 pointer on 24
28 pivot pin of 26
101 shower flange
110 transparent section of 101
116 screw notch in 101
118 pipe aperture in 101
130 electronic thermometer
132 liquid crystal display of 130
134 sensing foot of 130
135 recess in 134
136 mounting lugs on 101 for 130

DESCRIPTION OF A PREFERRED EMBODIMENT

Referring to FIG. 1, there is illustrated therein a shower flange thermometer 1 of this invention. FIG. 1 shows the shower flange 1 in the environment in which it is intended to be installed, namely, on a shower water pipe 4 which terminates in a shower head 6. Pipe 4 typically projects head-height or higher from the shower wall 8 (FIG. 3).

The body or casing of shower flange 1 typically is made of chrome-plated metal, although plastic alternatively might be used. Its general size and shape are standard, so as to allow the shower flange to function as a replacement for existing shower flanges. The outwardly directed face 2 of the shower flange is generally planar, although it may be slightly convex in places, for decorative effect. It has a transparent section 10, typically clear plastic, which functions as a window or dial (means for displaying temperature) for the thermometer assembly of the device. Temperature gauge indicia 11 may be printed or embossed on the transparent section 10 to indicate water temperatures in the range expected to be encountered, say from about 60 degrees to about 110 degrees Fahrenheit.

FIG. 2 shows the back of the shower flange 1, from which is visible one of a number of alternatively available temperature sensing and indicating mechanisms (or means). A bi-metallic temperature sensitive helical coil 20 has a pointer 26 on its inner end 24. The pointer may have a pin 28 attached to the inner face of the shower flange about which it pivots, or, it can be unsupported relative to the metal casing of the shower flange. The outer end 22 (pipe contacting means) of the coil 20 is pressed firmly against the water pipe 4 by means of a set screw 12 carried on a bracket 14. Together, screw 12 and bracket 14 comprise means for biasing the pipe contacting means against the pipe 4. The bracket is attached to the inner face of the shower flange. The set screw 12 is accessed through a semi-circular notch 16 in the cylindrical side wall 3 of the shower flange. The set screw is also used to secure the shower flange in place on the pipe 4, abutting the shower stall wall 8. The pipe passes through a circular aperture 18 in the center of the shower flange, as is the case with prior shower flanges.

It is to be noted that with proper configuration, the functions of the coil ends could be reversed, i.e. the pointer could be attached to the outer end.

The use of bi-metallic coils to record temperatures in such applications as home thermostats is common. The principle under which such coils work is well understood. Basically, each side of the flat ribbon of the coil is formed from a metal which expands and contracts (due to temperature changes) at a faster rate than does the metal of the other side. This unequal rate of expansion/contraction causes the coil to wind and unwind with changes in temperature. Thus, when the water in the pipe 4 gets hotter, the pipe will also get hotter. The pipe, in turn, will transfer heat to the coil 20, which coil then unwinds somewhat, rotating the pointer 26 up the temperature gauge 11. Cooling the water, through adjustment of the hot and cold shower valves, will cool the pipe and the coil—causing the pointer to move down the scale. Reading the position of the pointer relative to the window gauge 11 will allow the user to adjust the water temperature to his or her normal preference before having to actually enter the shower.

It should be noted that the printed gauge 11 should be calibrated to account for the fact that the outside surface of the pipe will normally be several degrees cooler (up to about four degrees cooler) than the temperature of the water passing through it. In many cases, simply printing all temperatures on the gauge up to four degrees hotter than what is actually "read" by the coil will suffice. However, more sophisticated calibration may be possible (for example, when the water has been running hot and then is suddenly cooled, the variance is temporarily reversed), particularly when electronic thermometers, discussed below, are used.

Turning to FIG. 4, an alternate embodiment of the invention is shown therein. It is to be noted that, for convenience, the last two positions of the reference numerals of this alternate embodiment of the invention duplicate those of the numerals of the embodiment of FIG. 1 where reference is made to corresponding or equivalent parts.

Shower flange 101 is also of conventional size and shape. A transparent window section 110 allows one to read the digital liquid crystal display 132 (displaying means) of a battery-powered electronic thermometer 130 (sensing means). Such thermometers, like bi-metallic coils, are known in the art and readily available. One example is discussed in U.S. Pat. No. 4,575,262, above, the entire disclosure of which is incorporated by reference herein.

The shower flange 101 is mounted by passing the shower pipe through a circular aperture 118. It is secured by means of a set screw or the like (comprising biasing means, not illustrated) which is accessed through a semi-circular notch 116 in the side wall of the shower flange.

Opposite from the set screw (so that it may thereby be biased toward the aperture 118 in place against the pipe) is a thermal sensing-pad or foot 134. In order to achieve more effective heat exchange, the foot preferably has a curved concave recess 135 (pipe contacting means) which is congruent with the convex curve of the pipe. The electronic thermometer 130 is held in place by means of appropriate fasteners, such as mounting lugs 136.

The temperature of the pipe is indicated in degrees on the LCD 132 and is visible to the shower user through the window 110. Again, appropriate calibration may be made to compensate for the temperature gradient which exists between the water and the outer surface of the pipe.

While the above provides a full and complete disclosure of the preferred embodiments of this invention, various modifications, alternate constructions, and equivalents may be employed without departing from the true spirit and scope of the invention. Such changes might involve alternate materials, components, structural arrangements, capacities, sizes, operational features or the like. Therefore, the above description and illustrations should not be construed as limiting the scope of the invention which is defined by the appended claims.

What is claimed is:

1. In a shower flange of the type which is installed at the junction of a shower pipe and a shower wall and which shower flange has a casing with a rear perimeter defining a plane and an aperture through which the shower pipe may pass, the improvement comprising:
   means for sensing temperature totally encased within the shower flange in that no portion of the sensing means extends out of the casing beyond the plane of the rear perimeter of the casing when the shower flange is so installed.

2. The shower flange of claim 1 further including:
   means within the casing for displaying temperature.

3. The shower flange of claim 2 wherein:
   the sensing means includes pipe contacting means.

4. The shower flange of claim 3 further including:
   means for biasing the pipe contacting means against the shower pipe.

5. The shower flange of claim 4 wherein:
   the sensing means includes a bi-metallic coil having first and second ends, and
   the sensing means includes a bi-metallic coil having first and second ends, and
   the second coil end is the pipe contacting means.

6. The shower flange of claim 5 wherein:
   the biasing means is a set-screw.

7. The shower flange of claim 6 wherein:
   the displaying means includes
   a transparent window in the flange, the window bearing temperature gauge indicia; and
   a pointer on the first coil end.

8. The shower flange of claim 4 wherein:
   the sensing means includes a battery-powered electronic thermometer, and
   the displaying means includes a liquid crystal display.

9. The shower flange of claim 8 wherein:
   the biasing means is a set-screw.

10. A shower flange thermometer including:
    a shower flange of the type which is installed at the junction of a shower pipe and a shower wall, the shower flange having a circular casing having a generally planar front face, the center of the front face forming a circular aperture through which the shower pipe may pass;
    a rear perimeter of the casing defining a plane;
    a thermometer totally encased within the casing in that no portion of the thermometer extends out of the casing beyond the plane of the rear perimeter of the casing, the thermometer having temperature sensing means adjacent to the aperture; and
    a transparent window in the face for displaying temperatures.

11. The shower flange thermometer of claim 10 further including:
    means for biasing the sensing means toward the aperture.

12. The shower flange thermometer of claim 11 wherein:
    the thermometer includes a bi-metallic coil, the coil having first and second ends, the first coil end terminating in a rotatable pointer visible through the window, and wherein
    the temperature sensing means includes the second coil end.

13. The shower flange thermometer of claim 12 wherein:
    the biasing means is a set-screw.

14. The shower flange thermometer of claim 11 wherein:
    the thermometer is electronic and includes a liquid crystal display visible through the window and wherein
    the temperature sensing means is a sensing-foot on the electronic thermometer, the foot forming a concave pipe-receiving recess.

15. Shower flange thermometer apparatus including:
    a circular shower flange of the type which is installed at the junction of a shower pipe and a shower wall and which shower flange has a casing having a central hole for the shower pipe;
    a rear perimeter of the casing defining a plane; and
    a thermometer totally encased within the casing in that no portion of the thermometer extends out of the casing beyond the plane of the rear perimeter of the casing.

* * * * *